(12) United States Patent
Gombert et al.

(10) Patent No.: US 8,095,376 B2
(45) Date of Patent: Jan. 10, 2012

(54) METHOD AND SYSTEM FOR ORDERING PRINT PRODUCTS BY ELECTRONIC MAIL

(75) Inventors: Barry G. Gombert, Rochester, NY (US); Frank M. Goetz, Fairport, NY (US); George L. Eldridge, Long Beach, CA (US)

(73) Assignee: Xerox Corporation, Norwalk, CT (US)

( * ) Notice: Subject to any disclaimer, the term of this patent is extended or adjusted under 35 U.S.C. 154(b) by 559 days.

(21) Appl. No.: 11/441,971

(22) Filed: May 25, 2006

(65) Prior Publication Data
US 2007/0276680 A1 Nov. 29, 2007

(51) Int. Cl.
*G06Q 10/00* (2006.01)
(52) U.S. Cl. ........................................................ 705/1.1
(58) Field of Classification Search .................. None
See application file for complete search history.

(56) References Cited

U.S. PATENT DOCUMENTS

| | | | | |
|---|---|---|---|---|
| 5,805,810 | A * | 9/1998 | Maxwell | 709/206 |
| 6,529,214 | B1 * | 3/2003 | Chase et al. | 715/744 |
| 6,577,907 | B1 * | 6/2003 | Czyszczewski et al. | 700/17 |
| 6,651,217 | B1 * | 11/2003 | Kennedy et al. | 715/224 |
| 6,654,779 | B1 | 11/2003 | Tsuei | 709/101 |
| 6,801,935 | B2 * | 10/2004 | Shen | 709/219 |
| 2002/0191210 | A1 * | 12/2002 | Staas et al. | 358/1.15 |
| 2002/0191211 | A1 * | 12/2002 | Miller et al. | 358/1.15 |
| 2003/0182378 | A1 * | 9/2003 | Treptow et al. | 709/206 |
| 2004/0153332 | A1 * | 8/2004 | Libuit et al. | 705/1 |
| 2004/0227960 | A1 * | 11/2004 | Farros et al. | 358/1.1 |
| 2005/0219613 | A1 * | 10/2005 | Hirashima | 358/1.15 |

* cited by examiner

*Primary Examiner* — John Hayes
*Assistant Examiner* — George Chen
(74) *Attorney, Agent, or Firm* — Kermit D. Lopez; Luis M. Ortiz; Ortiz & Lopez, PLLC (57) ABSTRACT

A automated method, system and computer program for ordering print products by electronic mail. An e-mail request for business cards or other print products, such as postcards or calendars, is generated by a user of an e-mail system and sent to a management system including a management program which, in response, causes the system to selectively retrieve additional information associated with the e-mail request from one or more databases. The management system then prepares the business card order, or other print product order, using the retrieved information. The databases may be internet accessible directory services or other types of databases which the management system can look up using the originating e-mail address contained in the e-mail request in order to retrieve the additional information. The print product order can be prepared by importing the additional information, such as print product, shipping, billing and/or approval information, into one or more templates.

10 Claims, 5 Drawing Sheets

METHOD AND SYSTEM FOR ORDERING PRINT PRODUCTS BY ELECTRONIC MAIL

TECHNICAL FIELD

Embodiments relate to methods and systems for ordering products, and more particularly, to systems and methods for electronically ordering print products. Embodiments additionally relate to internet ordering methods and systems for implementing such methods. Embodiments further relate to methods and systems for electronically ordering business cards.

BACKGROUND

The internet and other distributed computing environments are increasingly being employed for ordering products and services.

Business cards can currently be ordered electronically using the internet service. It is known that a user of a computer operably connected to the internet can use a web-to-print service for ordering business cards. Once the user has obtained access to the web-to-print service via their computer, a web-form is displayed and the user is prompted to manually enter information, such as their name, address and other contact details, into the form for the purpose of producing the business card. Other user information concerning the desired formatting of the business card must also usually be entered. Manually entering such information is prone to error and can lead to incorrect business cards being subsequently produced. Also, the user typically must verify that the printable version of the business card contains all the correct information in the desired format which is often a time consuming and laborious task.

Subsequent to verifying the printable version of the business card, a web-form is typically displayed to enter shipping and payment information. Again, the user must manually enter this data into the web form which can lead to yet further error and which requires yet more user time before the business order can be submitted for deposition.

There is a need to provide an improved methodology of ordering business cards and other print products.

The embodiments disclosed herein therefore directly address the aforementioned shortcomings of known techniques of ordering business cards and other print products by providing a methodology which enables print products to be ordered in a fast and efficient manner without the need for substantial manual data entry by the user.

BRIEF SUMMARY

It is therefore one aspect of the embodiments to provide for an improved method for electronically ordering business cards or other print products.

It is a further aspect of the embodiments to provide for an improved automated system for electronically ordering business cards or other print products.

It is also another aspect of the embodiments to provide for a computer program, which when run on a computer, performs a method for electronically ordering business cards or other print products.

The aforementioned aspects and other objectives and advantages can now be achieved as described herein. In one aspect, an automated method for ordering print products, such as business cards, postcards, calendars or the like, by electronic mail comprises delivering an e-mail request for one or more print products to a management system, the e-mail request being generated by a user of an e-mail system, selectively retrieving additional information associated with the e-mail request from one or more databases, and preparing a print product order using the retrieved information.

By preparing the print product order using additional information automatically retrieved from a database, the user can request an order by simply sending the e-mail request without the need for further data entry so that the ordering method is substantially less prone to errors. A user ordering print products by this method can accordingly order the print products in a simpler and more rapid manner compared to known methods which involve substantial manual data entry by the user at the time the user places the order.

The additional information can be selectively retrieved using the originating e-mail address of the e-mail request. The database(s) can correlate the originating e-mail address with the additional information. The one or more databases can comprise internet accessible directory services or global address books of the e-mail system. The user information can be entered into the directory service or other database by the user or information technology staff during the initial setup of the user's particulars in the database preparatory to performing the ordering method.

The additional information preferably comprises text and/or graphical data representing, for example, the print product description, shipping instructions, billing particulars and/or approval information. The print product order can be prepared by applying the text and/or graphical information to at least one template.

Preferably, the print product comprises a business card. The business card order can be prepared by providing one or more business card templates and importing at least part of the retrieved additional information into the business card template(s) for providing a printable version of the business card. Also, one or more business card ordering policies can be applied to the business card template.

The method can include the step of verifying the additional information is sufficient for preparing the print product. An e-mail alert can be sent to the user in response to determining the additional information is insufficient for producing the print product order. Alternatively, an e-mail confirmation can be sent to the user in response to determining the additional information is sufficient for producing the print product order.

The method can include approving or declining the e-mail request in response to obtaining approval of the user.

According to another aspect, a system for ordering print products, such as business cards, postcards, calendars or the like, by electronic mail has a processor operably connectable to an e-mail system and to a database of information associated with one or more users of the e-mail system. A memory is coupled to the processor and a management program resides in the memory. When the management program is executed by the processor, the management program, in response to the processor receiving an e-mail request for a print product from a user of the e-mail system, selectively retrieves additional information associated with the e-mail request from the database and prepares a print product order using the retrieved additional information.

Advantageously, the system enables the user to order print products, such as business cards, by simply generating and sending an e-mail to the system without the user having further to enter print product information or other order information in the e-mail request or an associated electronic form.

Preferably, the print product comprises a business card and the additional information comprises a business card description, shipping instructions, billing particulars and/or approval information. The one or more databases can be an internet accessible directory service or global address book of the e-mail system. The management program can be configured to determine the originating e-mail address of the e-mail request, and to use the originating e-mail address to selectively retrieve the additional information from the directory service or global address book.

According to yet another aspect, a computer program product comprises: a computer-usable data carrier storing instructions that, when executed by a computer, cause the computer to perform a method for ordering print products, the method comprising: receiving an e-mail request for at least one print product, such as a business card, post card calendar or the like, sent by a user of an e-mail system, selectively retrieving additional information associated with the e-mail request from at least one database, and preparing a print product order using the retrieved information.

The additional information can be selectively retrieved using the originating e-mail address of the e-mail request, the database(s) correlating the originating e-mail address with the additional information. The one or more databases can be an internet accessible directory service or global address book of the e-mail system.

The one or more print products can be business cards and the additional information can comprise business card details, shipping instructions, billing particulars and/or approval information. The step of preparing the business card order can comprise importing the additional information into at least one template. For example, a business card template can be provided and the business card details imported into the business card template. Also, one or more business card ordering policies can be applied to the business card template.

The method can include verifying the additional information is sufficient for preparing the print product order. An e-mail alert can be sent to the user in response to determining the additional information is insufficient for producing the print product. Alternatively or additionally, the method can include sending an e-mail confirmation to the user in response to successfully preparing the print product order.

BRIEF DESCRIPTION OF THE DRAWINGS

The accompanying figures, in which like reference numerals refer to identical or functionally similar elements throughout the separate views and which are incorporated in and form a part of the specification, further illustrate the embodiment, together with the background, brief summary, and detailed description, serve to explain the principles of the illustrative embodiment.

DETAILED DESCRIPTION

The illustrative embodiment provides an approach to ordering print products by electronic mail which enables a user to order a print product, such as a business card, in a fast and efficient manner without having to manually enter additional data required for formulating the print product.

For the purposes of discussion hereinafter, a "print product" refers to any product or logical unit of work produced by printing that is to be completed for the user in accordance with a print product order. The print product can be a business card, postcard or other type of card, or a multiple page document such as a calendar or the like.

Figure 1:
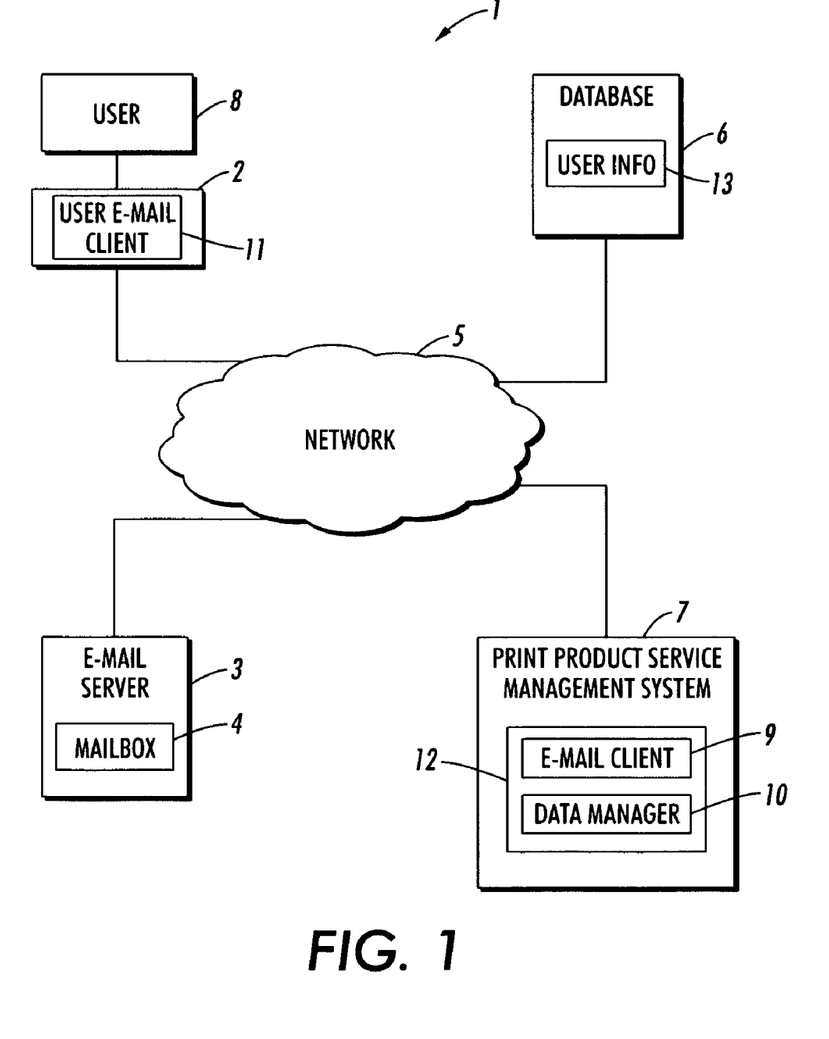
FIG. 1 illustrates an automated system for ordering print products by electronic mail in accordance with one embodiment.

Referring to FIG. 1 of the accompanying drawings, which illustrates an automated system for ordering print products by electronic mail according to an embodiment, a suitable environment 1 for practicing the illustrative embodiment is a distributed computing environment 1, such as the internet, in which electronic mail operates. A print product service management system 7 is operably connected, via network 5, to at least one database 6, an e-mail server 4 and a user computer 2. As will be explained in more detail below, the management system 7 is configured to automatically prepare a print product order using additional user information 13 stored in the database in response to receiving an e-mail request from a user 8 of the e-mail system 1. Advantageously, the print product management system 7 enables the user 8 to order print products, such as business cards, by the user simply generating and sending an e-mail to the print product management system 7 without the user having further to enter print product information in the e-mail request or an associated electronic form.

In the example of the illustrative embodiment shown in the accompanying figures, the print product service management system 7 is a production printing system 7 having a computer integrated therein which is capable of processing the print product order generated by the management system 7 and printing the print products in accordance with the generated order. However, those skilled in the art would understand that the management system 7 could be a computer configured to communicate with a separate print production unit for printing print products. Also, in the illustrative embodiment, the user computer 2 can be any type of computer, such as a desk or lap top computer, or other device capable of sending and receiving e-mails, such as for example a mobile telephone or other intelligent handheld device. Both the management system 7 and user computer 2 can be operably connected to the network 5 using wireless or hardwire technology as is known in the art. Database 6 can be any type of data storage which provides for a location to store and retrieve user information and other resources. In the illustrative embodiment, database 6 is network accessible in the distributed computing environment 1. However, the database 6 can alternatively be located locally on the print product service management system 7.

Preferably, the distributed computing environment 1 is an internet e-mail system having one or more user agents (MUAs), mail transfer agents (MTA), mail delivery agents (MDA) and mail retrieval agents (MRA) accordingly distributed among the user computer 2, e-mail server 3, management system 7 and database 6, such that e-mails can be composed and communicated between the user computer 2, e-mail server 4, management system 7 and/or database 6 according to internet standards as is known in the art. An interface or module 12 running on the management system 7 provides for the ability to connect, access, query, and retrieve information from one more data stores, such as for example a relational database, xml database, directory service or content repository.

Print product management system 7 operates the management module 12 which is responsible for preparing the print product order placed by the user. The module consists of software residing in memory of a processor of the management system but the module may alternatively be implemented as hardware. The module combines the functionality of a data management program 10 for formulating the print product order with an E-mail client 9 for sending and receiving e-mails from the network 5 and retrieving user information 13 from the database 6. In the illustrative embodiment, the e-mail client 9 and data manager 10 are separate programs or modules which are run locally on the management system 7 and which interact with one another. However, the e-mail client 9 and/or data manager 10 can be run from remote locations via network 5. Also, the e-mail client and data manager can be combined as a single module. Those skilled in the art would know that there are multiple modes of implementing such module(s).

Figure 2:
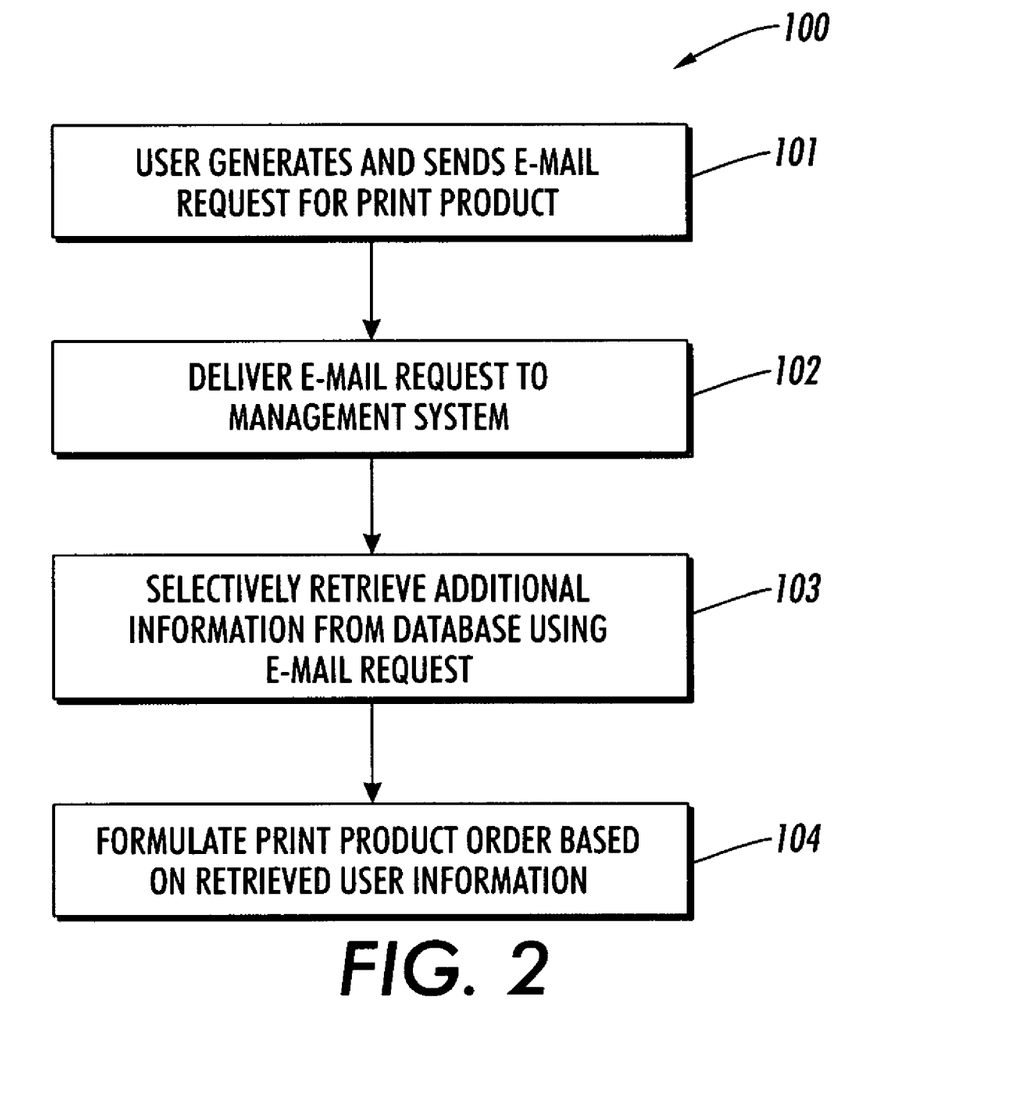
FIG. 2 illustrates a simplified flow-diagram of the general workflow used in ordering print products by electronic mail in accordance with an embodiment.

FIG. 2 provides a general overview of the steps performed in the method for ordering print products by electronic mail in accordance with an embodiment. The method 100 can be implemented in an automated system, such as for example, the automated system 1 of the illustrative embodiment of FIG. 1. Initially, a user generates an e-mail request for a print product as indicated in step 101. Thereafter, the e-mail request is delivered to a management system (step 102). In the embodiment shown in FIG. 1, steps 101 & 102 are performed by the user 8 operating the user e-mail client 11 running on the user computer 2 to compose and subsequently send the e-mail request via network 5 to the mailbox 4 contained in E-mail server 3 and then the management system 7 retrieves the e-mail request from the mailbox 4. A user in the context of the system of FIG. 1 is a user of an e-mail system that provides for any database 6 which can correlate user information 13 with data contained in the e-mail request.

Thereafter, additional user information which is needed for producing the print product is selectively retrieved from a database (step 103). In the illustrative embodiment of FIG. 1 data contained in the e-mail request is used by the management system 7 to perform a search or look up of additional user information 13 which is pre-stored in the database 6 and which is then retrieved from the database.

Information retrieved 13 from the database can be any type of data relating to a user, such as data representing the users' name, address and telephone/fax information and other contact details, and/or the users' properties for producing the print product, such as a preferred print product description. For example, if the print product is a business card, the additional user information 13 can be the user's business card information including the business card description. If the print product is a postcard or calendar, the additional user information 13 for formulating the postcard or calendar may be user's personal pictures, photos or images, or birthday or other event content stored in a personal database. The information is generally in text and/or graphical format suitable for importing into templates.

Following retrieval of the additional user information, the business order is then prepared (step 104) for deposition. Step 104 is implemented in the illustrative embodiment of FIG. 1 by the management system 7.

Advantageously, by preparing the print product order using the additional user information automatically retrieved from the database, the user can place a business card order by simply sending the e-mail request without performing further data entry so that the ordering method is substantially less prone to errors and provides the user with a simpler way of ordering a print product compared to methods and systems which involve substantial manual data entry by the user.

Furthermore, in other embodiments of the method and system for ordering print products by e-mail, the additional user information associated with the e-mail request can be retrieved from a plurality of databases (not shown) storing different types of user information. This may be achieved by configuring the management system to look up and retrieve different types of user information stored in different databases using the same e-mail request.

Figure 3:
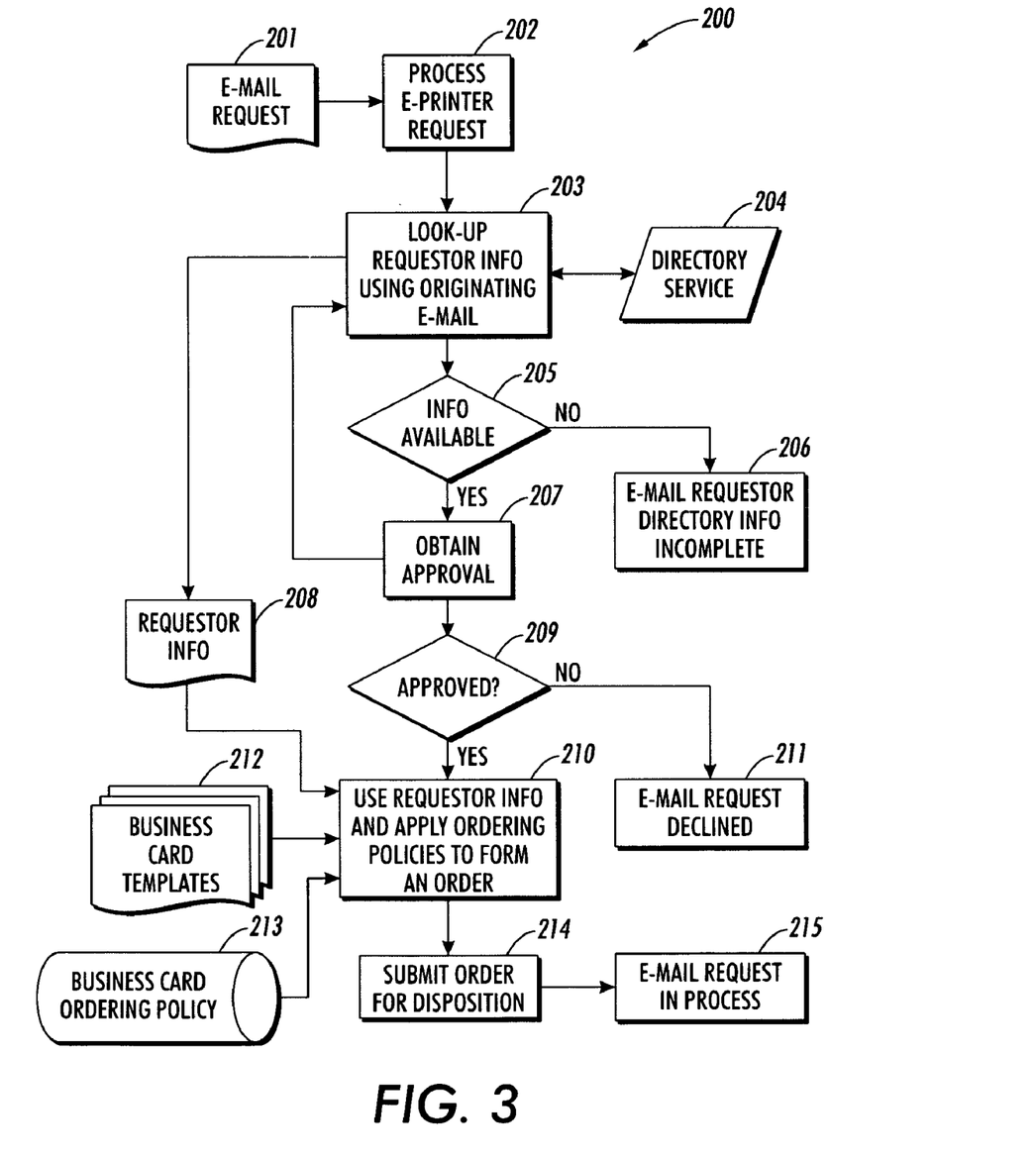
FIG. 3 illustrates a flow-diagram outlining the general steps which are performed for ordering business cards by electronic mail in accordance with another embodiment.

In a preferred embodiment of the method for ordering print products, the print product is a business card. A flow diagram illustrating the basic steps for performing a method for ordering business cards by electronic mail in accordance with an embodiment is shown in FIG. 3. Method 200 can be implemented in the distributed computing environment 1 of FIG. 1 in which the database 6 is implemented as a directory service (204 in FIG. 3) which supports the user's e-mail system and in which the management system 7 comprises a business card service management system capable of printing business cards.

A directory service provides for a network accessible location to store and retrieve address, e-mail, print-queues, or other resources available in a distributed computing environment. The directory is typically built according to a specification that holds data organized in a well-defined structure and is part of the computing environment that provides the means for the e-client to locate and identify the users and resources available in the system. Examples of directory services 204 known in the art include The Lightweight Directory Access Protocol (LDAP), X.500 and Microsoft Active Directory. The management module 12 of the business card management system 7 can be configured to register with, access, and manage multiple directory services using a single set of well-defined interfaces built using Application programmers' interfaces (APIs') such as Microsoft's Active Directory Service Interface (ADSI). Preferably, the management module 12 has an abstract interface that provides for the ability to access a number of different directory services using a single API. Microsoft (ADS), Sun Java (Java Naming and Directory Interface:JNDI), and Novell (eDirectory) all provide APIs for directory service interface.

Figure 4:
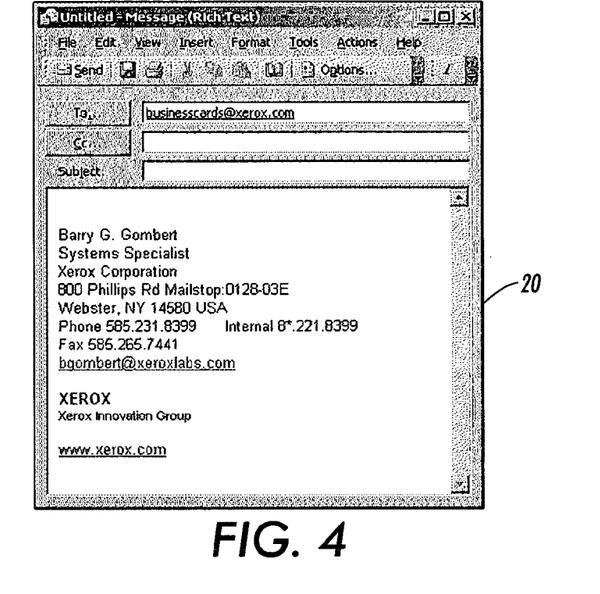
FIG. 4 illustrates a typical screen shot of an e-mail request generated by a user of the automated system of FIG. 1.
Figure 5:
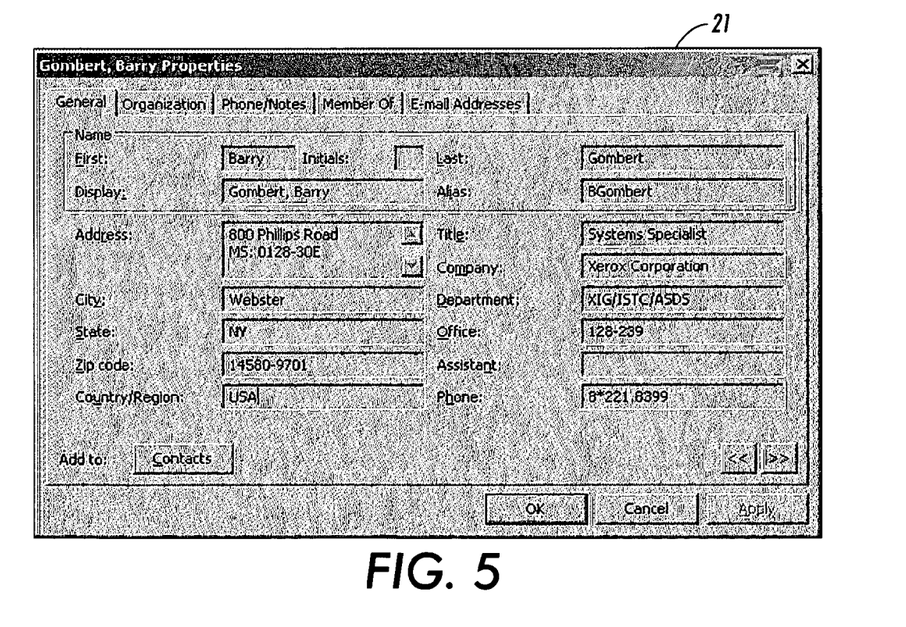
FIG. 5 illustrates a typical screen shot of user information entered into the database of the automated system of FIG. 1.

A user e-mail request 201 (FIG. 3) for a business card order to be placed, which contains the originating e-mail address of the request, is delivered to the management system 7 and processed (step 202). A typical screen shot 20 of an email request 201 is shown in FIG. 4. Management system 7 functions as the e-mail client with the capability to access and read entries in the directory service 204. Requesting users' properties or information are contained in the directory service 204 and are entered and managed by the IT staff responsible for the e-mail system so that the directory service correlates the users' properties and information with the user's e-mail address. A typical screen shot 21 of user information entered into the directory service 203 is shown in FIG. 5.

As indicated in step 203, the additional user/requestor information needed for a business card (i.e. name, address, contact information) is retrieved from the directory service using the originating e-mail address which normally will be the user's e-mail address. The management system 7 uses the originating e-mail address as a key in a query against the directory service 204 to perform the lookup in order to automatically associate the directory information to the e-mail request 201 being sent to the management system. Thereafter, the management system 7 verifies that the retrieved information is sufficient for the purpose of producing the business card (step 205).

It is important that any user information in the e-mail systems directory service 204 is correct. If the system determines that the retrieved information is insufficient, the management system 7 sends an e-mail alert to the user as indicated in step 206 alerting the user that the directory service information is incomplete. Preferably but not essentially, such an e-mail alert contains an indication of the information which is incomplete. The user can rectify this problem by updating the directory service with the necessary information.

If, however, the management system 7 determines that the retrieved information is sufficient for producing the business card, the obtain approval process step 207 is then performed in which one or more mechanisms are applied in order to either "approve" or "decline" the e-mail request 201. Approval processes may be, for example, credit card approval for the purpose of payment, shipping approval, or access approval in cases in which registration to the business card service is necessary. The approval process step 207 may be performed using information retrieved from the directory service 204 or by retrieving information from another directory service or database.

Those skilled in the art would understand that the obtain approval process step 207 need not necessarily be implemented in the order indicated in FIG. 3 and could be implemented at other stages of the workflow between steps 202 and 214.

Figure 6:
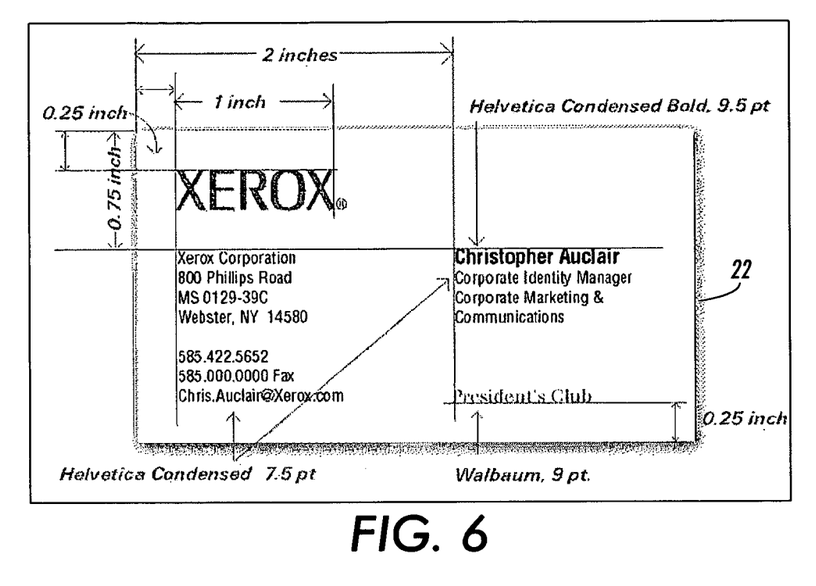
FIG. 6 illustrates a typical example of a business card policy used to prepare the business card order according to the method depicted in FIG. 3.
Figure 7:
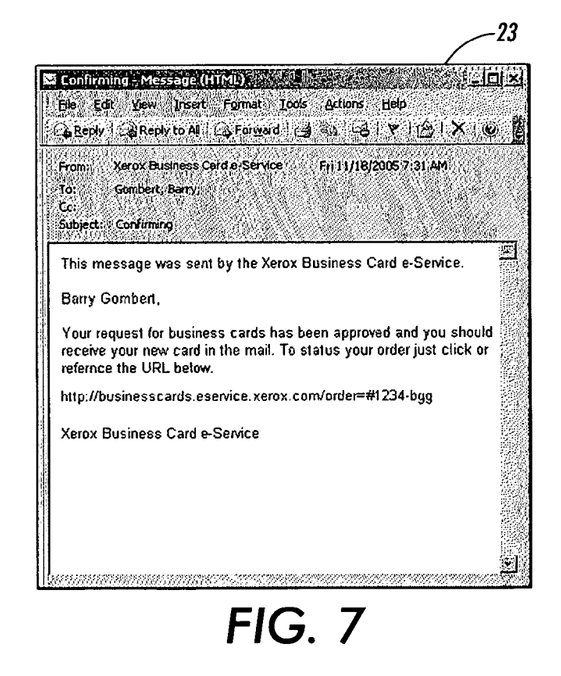
FIG. 7 illustrates a typical screen shot of a service confirmation generated by the print product management system of FIG. 1 and sent to the user.

If the e-mail request for an order to be placed is declined, then no business card order is prepared (see steps 209,211). If necessary, an e-mail alert can be generated by the management system 7 and sent to the user notifying the user that the request has been declined (not shown). If, however, the e-mail request is approved, the method continues to the business card order preparation stage (step 210) in which the additional user information and properties retrieved from the directory service 6 are used to formulate the business card order. In formulating the business card order, a particular business template 212, as indicated in the user's properties, is selectively retrieved by the management system from an archive and populated with the user's information. The user's properties that are contained in the directory service 204 are used in forming a printable version of the card. The management system 7 also provides for the ability to enforce departmental or other policies in the formation of the card (e.g. logos, titles, etc.). One or more corporate or other business card ordering policies 212 are applied to the order. A screen shot 22 of a typical printable version of the business card indicating the business card ordering policies is shown in FIG. 6.

Forming the order in accordance with method step 210 can also include applying the retrieved information to other workflow templates, such as shipping, payment, and/or billing templates, if approval is obtained. For example, in the case of shipping approval, the shipping name and address retrieved from the directory service 204 can be used to populate a shipping template to complete the shipping portion of the business card order.

The approval and other workflow processes are implemented in accordance with work flow management principles, such as Business Process Management (BPM) workflows as is known in the art. Such workflow management is configured in such a way that the execution of the workflow is integrated within the method steps 203-210. Workflow management may be used to control and track the requests and order approvals, and handle electronic billing and other business processes. The data manager 10 of management system 7 is configured to access and apply any workflows associated with the requesting user of the system and stored on the network. Many database systems and environments have expanded capabilities which include the definition and storage of workflows that help control and oversee access, use and manipulation of data. Both Oracle and Microsoft provide a workflow component as part of their database offerings. Approval could be performed using simple scripts defined in the management system 7 or complex workflows concerning user information or policies defined and stored externally in the database 6.

Once the printable version of the card has been formulated, the business card order is completed and the management system 7 submits the order for deposition (step 214). The e-mail request is then processed for printing (step 215). Upon completion the management system can inform the user by e-mail of the status of the request and provide a URL to access updated status.

It will be appreciated that variations of the above-disclosed and other features, aspects and functions, or alternatives thereof, may be desirably combined into many other different systems or applications.

Also, it will be appreciated that various presently unforeseen or unanticipated alternatives, modifications, variations or improvements therein may be subsequently made by those skilled in the art which are also intended to be encompassed by the following claims.

What is claimed is:

1. An automated method for ordering print products by electronic mail, the method comprising:

delivering to a computer management system a user e-mail request for at least one print product to be produced by printing;

the computer management system automatically selectively retrieving additional user print product information associated with said e-mail request from at least one computer directory service in response to said computer management system receiving said e-mail request for said at least one print product, wherein said additional user print product information comprises text and/or graphical data to be included in the print product itself, and an indication of at least one particular print product template to be populated with said text and/or graphical data, and wherein automatically selectively retrieving said additional user print product information to be printed comprises the computer management system using an originating e-mail address of the user e-mail request received by said computer management system as a key in query against said at least one computer directory service to perform a lookup of said additional user print product information; and the computer management system automatically associating said lookup additional user print product information to said user e-mail request received by said computer management system;

the computer management system automatically preparing a print product order using said retrieved user print product information, and wherein automatically preparing said print product order comprises automatically retrieving said at least one particular print product template from an archive of print product templates using said retrieved at least one particular print product template indication; and automatically populating said retrieved text and/or graphical information to be included in said print product into said at least one particular print product template retrieved from said archive.

2. The method of claim 1, further comprising the computer management system automatically selectively retrieving print product description, shipping, billing and/or approval information associated with said e-mail request from a computer directory service in response to said computer management system receiving said e-mail request for said at least one print product.

3. The method of claim 2, wherein said at least one print product comprises a business card.

4. The method of claim 3, wherein said directory service comprises an internet accessible directory service or global address book of an e-mail system.

5. The method of claim 4, wherein preparing said business card order comprises
   automatically retrieving said at least one particular business card template from an archive of print product templates using said retrieved at least one particular business card template indication; and
   automatically populating said retrieved text and/or graphical information to be included in said business card into said at least one particular business card template retrieved from said achieve.

6. The method of claim 5 wherein preparing said business card order comprises providing at least one business card template applying at least one business card ordering policy to said business card template.

7. The method of claim 2, further comprising verifying said additional user information is sufficient for preparing said print product.

8. The method of claim 7, further comprising either sending an e-mail alert to said user in response to determining said additional user information is insufficient for producing said print product order or sending an e-mail confirmation in response to determining said additional information is sufficient for producing said print product order.

9. The method of claim 2, further comprising approving or declining said e-mail request in response to obtaining approval of said user.

10. The method of claim 1, further comprising processing said print product order; and
   printing said at least one printer product in accordance with said print product order.

* * * * *